(12) United States Patent
Wischnewskij et al.

(10) Patent No.: US 7,973,451 B2
(45) Date of Patent: Jul. 5, 2011

(54) ULTRASONIC LINEAR MOTOR

(75) Inventors: Wladimir Wischnewskij, Waldbronn (DE); Alexej Wischnewskij, Woerth (DE)

(73) Assignee: Physic Instrumente (PI) GmbH & Co., KG, Karlsruhe (DE)

( * ) Notice: Subject to any disclaimer, the term of this patent is extended or adjusted under 35 U.S.C. 154(b) by 206 days.

(21) Appl. No.: 12/083,815

(22) PCT Filed: Sep. 7, 2006

(86) PCT No.: PCT/EP2006/066138
§ 371 (c)(1),
(2), (4) Date: Aug. 27, 2009

(87) PCT Pub. No.: WO2007/045525
PCT Pub. Date: Apr. 26, 2007

(65) Prior Publication Data
US 2010/0072857 A1 Mar. 25, 2010

(30) Foreign Application Priority Data

Oct. 21, 2005 (DE) .......................... 10 2005 050 627
Nov. 7, 2005 (DE) .......................... 10 2005 053 018

(51) Int. Cl.
*H01L 41/08* (2006.01)
(52) U.S. Cl. .................................................. 310/323.02
(58) Field of Classification Search ............ 310/323.02, 310/328
See application file for complete search history.

(56) References Cited

U.S. PATENT DOCUMENTS

| 5,036,245 A | 7/1991 | Ohnishi et al. ................ 310/323 |
| 5,170,088 A | 12/1992 | Naito et al. .................... 310/323 |
| 6,765,335 B2 | 7/2004 | Wischnewskiy ......... 310/323.02 |

FOREIGN PATENT DOCUMENTS

| EP | 0601671 A1 | 6/1994 |
| EP | 0725476 A1 | 8/1996 |
| EP | 1267425 A2 | 12/2002 |
| WO | WO2006/027031 A1 | 3/2006 |
| WO | WO2006/050759 A1 | 5/2006 |

OTHER PUBLICATIONS

Notification of Transmittal of Translation of the International Preliminary Report on Patentability, English translation of the International Preliminary Report on Patentability and English translation of the Written Opinion of the International Searching Authority.

*Primary Examiner* — Mark Budd
(74) *Attorney, Agent, or Firm* — Gerald T. Bodner (57) ABSTRACT

The invention relates to an ultrasonic linear motor (1) comprising a plate-type ultrasonic oscillator (2) with two planar parallel main faces, two end faces and two lateral faces and a displaceable element (9) that engages with at least one guide rail (10) and has two friction parts, said element interacting with the ultrasonic oscillator to cause friction via the lateral faces of the friction parts. The lateral faces of the ultrasonic oscillator are planar and are inclined at the same angle in relation to a longitudinal plane of symmetry, in such a way that the intersection lines between the planes of the lateral faces and the longitudinal plane of symmetry run parallel to the main faces of the ultrasonic oscillator. The friction parts of the displaceable element are interconnected by springs.

12 Claims, 6 Drawing Sheets

ULTRASONIC LINEAR MOTOR

The invention relates to an ultrasonic linear motor which can, be used in inexpensive precision optical systems or similar apparatus.

Known are ultrasonic linear motors comprising ultrasonic oscillators in the form of small plates, to which the friction element is affixed (see, for example, EP 1 267 425 A). A press-on device is thereby constructed in such a way that the force applied to the friction element is entirely transferred to the linear ball bearing of the mobile element. Thus, the friction losses are increased, and it is impossible to use inexpensive plain bearings in such motors.

Further known are ultrasonic linear motors in which the mobile element encloses the ultrasonic oscillator (see, for example, EP 0 601 671 A). In these motors, the ultrasonic motor forms a guide rail for the mobile element. No linear ball bearings are required for these motors.

A disadvantage of these motors is that the oscillator is complicated with respect to its constructive realization and is, therefore, expensive to manufacture. The motors can be used in inexpensive optical systems. However, they are inexact as far as the positioning of the mobile element is concerned, and it is impossible to reduce them in size as desired.

It is the object of the invention to provide an improved ultrasonic linear motor of a simplified construction, which additionally allows an increased positioning accuracy for the mobile element, a more simple manufacturing and assembly technology for the motor, a reduction of the costs as well as smaller dimensions.

This object is achieved with an ultrasonic linear motor comprising the features of claim 1. Useful advancements of the inventive idea are defined in the dependent claims.

The invention includes the essential idea to bring a plate-type ultrasonic oscillator known per se, in an assembly with a mobile element which has two friction parts and is engaged with a guide rail, into a suitable force constellation relative to these guiding means. Depending on the plate shape and the construction of the mobile element it is possible to use a portion of the contact pressing force of the friction elements against the surfaces of the implemented oscillator also for pressing the mobile element of the motor against its guide.

Moreover, the invention includes the idea to provide a resilient connection between the aforementioned friction parts, which generates a suitable contact pressing force of the mobile element acting against the lateral faces of the ultrasonic oscillator. Moreover, a suitable contact pressing force acting between the mobile element and the aforementioned guide rail is thus provided. Finally, the invention includes the idea of bringing the aforementioned contact pressing forces into a predetermined relation with respect to each other by implementing the lateral faces of the ultrasonic oscillator in an inclined manner.

The invention makes it possible to substantially simplify the construction of the miniature ultrasonic linear motor and to waive the use of precision antifriction bearings. This increases the alignment accuracy of the mobile element because its movement is realized relative to the surface of the precisely ground guide rail. The friction losses in the plain bearing are reduced, the assembly technology is simplified, the manufacturing costs are reduced, the dimensions are reduced. Thus, it is possible to use the motor in inexpensive precision optical systems.

In one embodiment of the invention it is provided that connection electrodes of the ultrasonic oscillator comprise elastic, thin, conductive rods, the one end of which is firmly connected to the corresponding electrodes and the other end of which is firmly fixed in relation to the guide rail. This enlarges the constructive configuration possibilities of the miniature motor according to the invention.

In another embodiment it is provided that the guide rail is realized in a clamp-type manner and is firmly connected to a common electrode of the ultrasonic oscillator. This simplifies the construction of the miniature motor.

In a useful embodiment the main faces of the ultrasonic oscillator are rectangular, and in yet another embodiment this also applies to the lateral faces.

The resilient or elastic connection of the friction parts of the mobile element with each other is realized, in a useful embodiment, by a compression spring which elastically biases the friction parts against each other. In one embodiment of this configuration this compression spring, too, is of a clamp-type manner, with the friction parts being placed at the free ends of the legs of the clamp.

Advantages and useful effects of the invention become more apparent from the following description of a preferred embodiment as well as from modifications thereof and from preferred aspects of the invention by means of the figures. In the figures.

Figure 1:
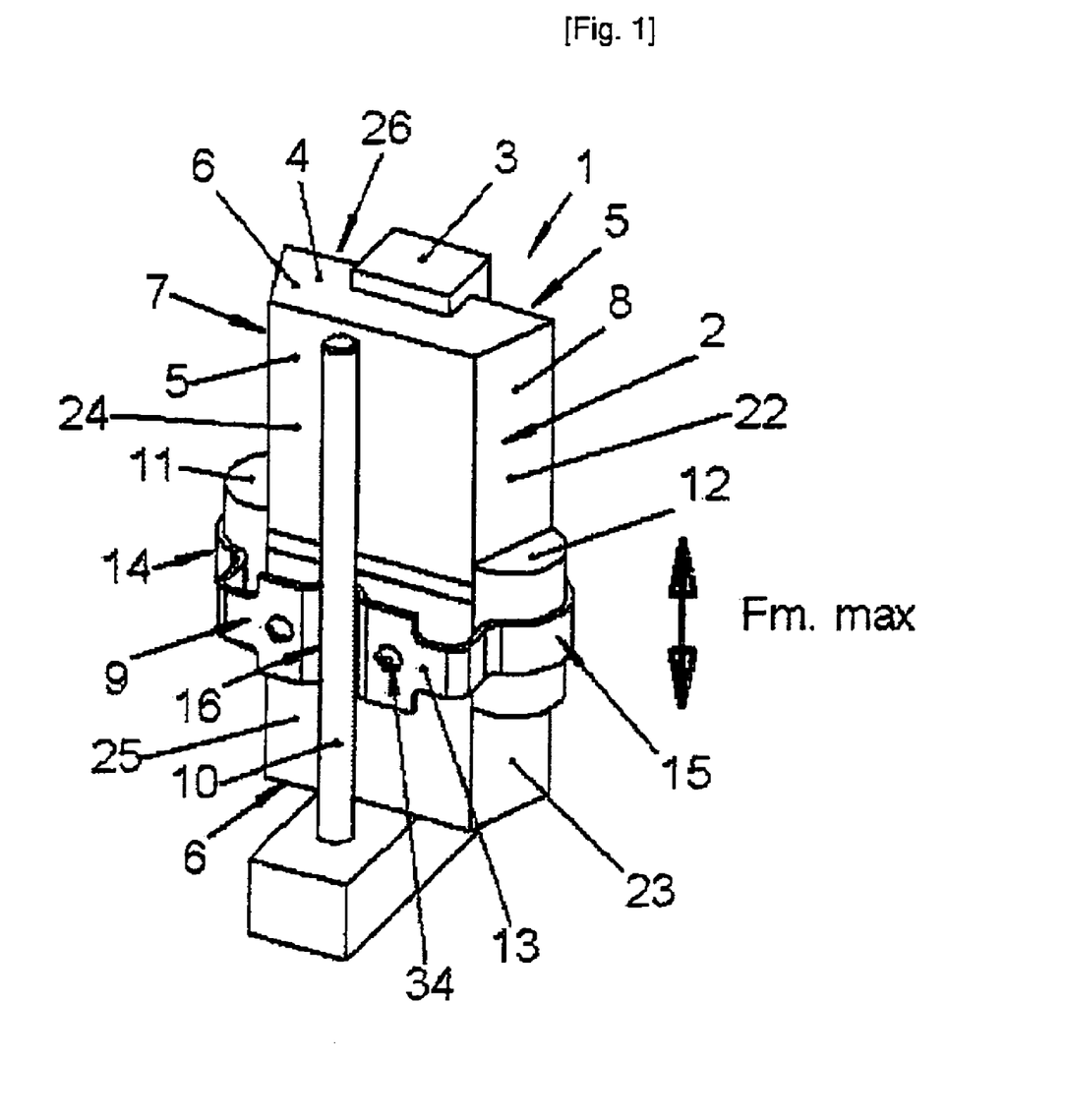
FIG. 1 shows the construction of the proposed motor in one embodiment.

A proposed ultrasonic motor 1 according to FIG. 1 comprises an ultrasonic oscillator 2 which is disposed in a holder 3. The oscillator 2 is realized as a plate 4 having parallel rectangular lateral faces (main faces) 5, end faces 6 and lateral faces 7 and 8.

The motor 1 comprises a mobile element 9 which is in coincidence with at least one guide rail 10. The mobile element 9 is comprised of two friction parts 11 and 12 which are connected to each other by a compression spring 13, whereby each of the friction parts is pressed against the corresponding lateral face 7 and 8 of the plate 4.

For holding the friction parts 11 and 12, the compression spring 13 includes special fixing points 14 and 15. Moreover, it can comprise a sliding groove 16 on which the mobile element 9 of the guide rail 10 slides.

Figure 2:
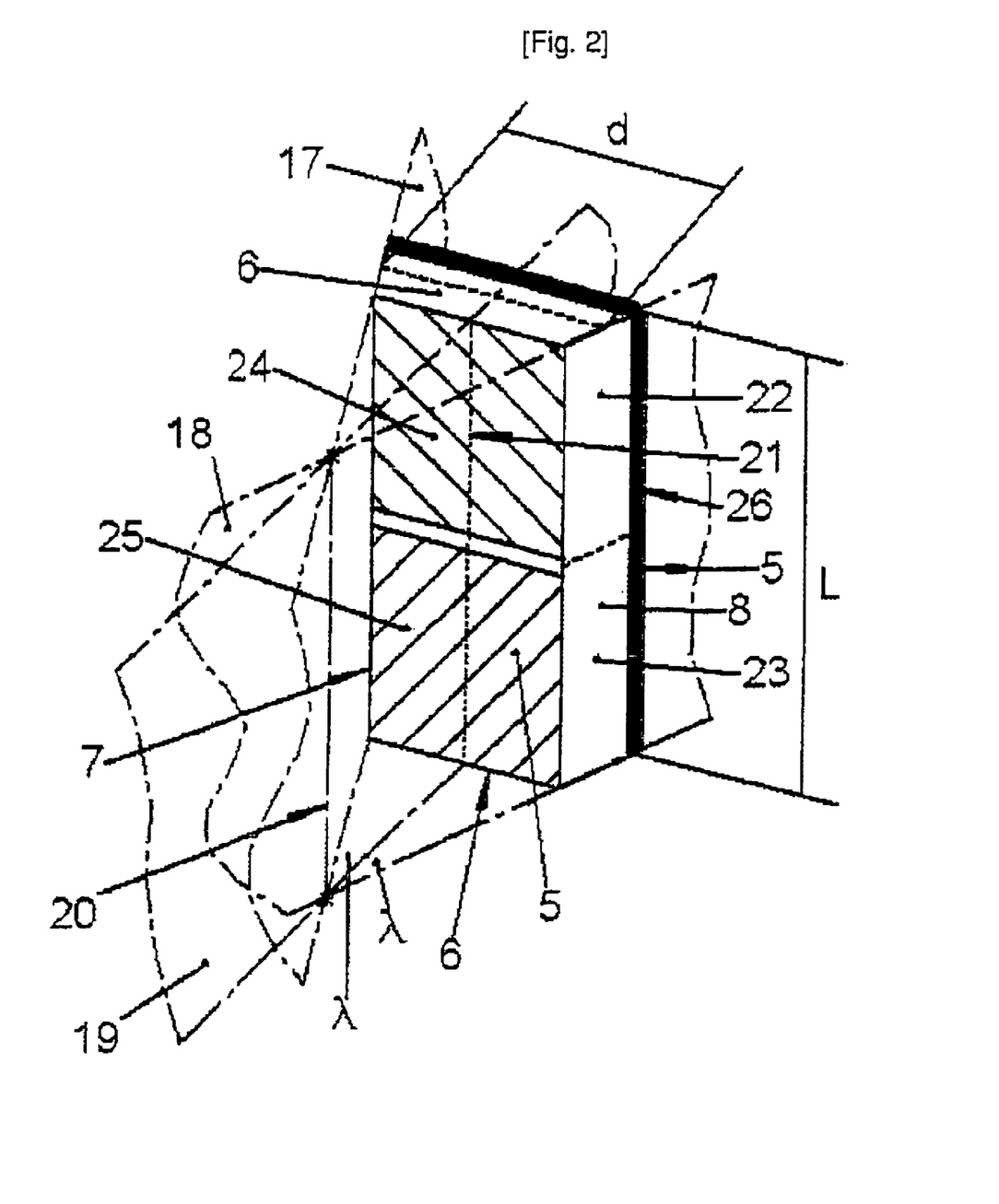
FIG. 2 shows the ultrasonic oscillator of the motor of FIG. 1.

In the motor as proposed, the lateral faces 7 and 8 of the plate 4 are configured as planes 17 and 18 which are inclined at the angle in relation to a longitudinal plane of symmetry 19 of the plate 4, which is shown in FIG. 2. The intersection line 20 between the planes 17 and 18 of the plate 4 and the plane of symmetry 19 extends parallel to the main edges 5. L is the length of the plate 4, and d is the length of the central line of the end face. The ratio of L/d is chosen to amount to approximately 2.34.

The longitudinal plane of symmetry 19 is the plane that extends perpendicularly to the main faces 5 and through a longitudinal bisecting line 21 of the face 5. The line 21 represents the bisecting line of face 5 that extends parallel with respect to the length of plate 4 (FIG. 2).

The ultrasonic oscillator 2 of the motor as proposed has two generators 22 and 23 for asymmetric acoustic standing waves.

The plate 4 of the oscillator 2 may be made entirely of a piezoelectric ceramic. In this case, it may be provided with two excitation electrodes 24 and 25 and one common electrode 26. Each of the generators 22 and 23 is thereby formed with the corresponding electrode 24 or 25, of a part of electrode 26 and the piezoceramic between the electrodes 24 and 25 and a part of electrode 26. To allow the application of an electric excitation voltage, each of the electrodes 24, 25 and 26 must have an elastic connection by means of which the electrode is connected to the electric excitation source of the oscillator (not shown in the figures).

In another embodiment of the oscillator 2 the plate 4 can be realized as a multilayer component with two multilayer generators for acoustic waves.

The plate 4 may also be an assembled component, comprised of a passive resonator and piezoelectric excitation elements (not shown in the figures) connected to the same.

On both lateral faces 7 and 8 thin, abrasion-resistant layers of an abrasion-resistant material may be applied.

Figure 3:
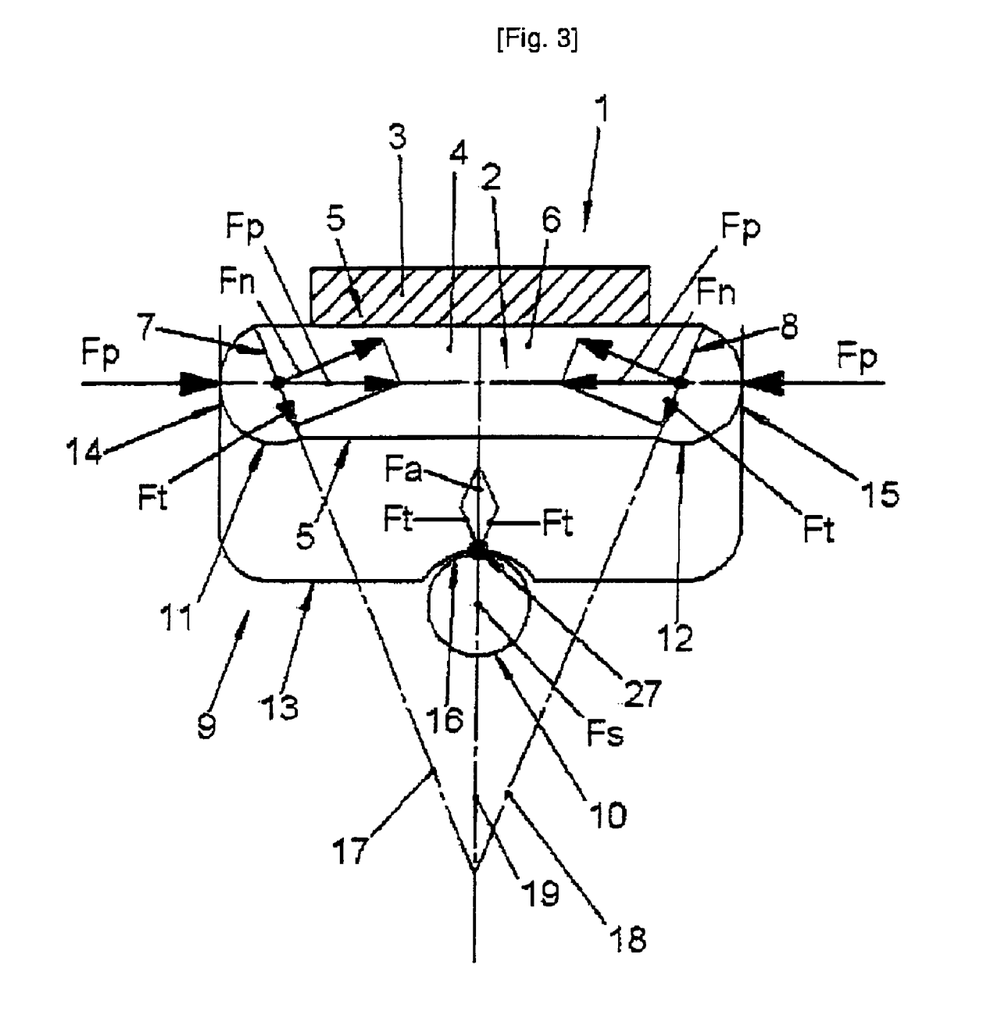
FIG. 3 shows a schematic representation of forces occurring in the motor.

FIG. 3 shows a schematic top view of the motor. It illustrates the forces applied to the compression spring 13 in the motor 1. The force $F_p$ represents the spring force of the spring 13, which act from the direction of the fixing points 14, 15 and the spring 13 onto the friction parts 11 and 12. These forces are transferred to the lateral faces 7, 8 of the plate 4. Each of the forces $F_p$ can be divided into the force component $F_n$ acting perpendicularly with respect to the surface 7 or 8, i.e. perpendicularly with respect to the plane 17 or 18, and into the force component $F_t$ acting lengthwise with respect to the surface 7 or 8, i.e. lengthwise with respect to the planes 17 or 18.

As the force $F_t$ acts lengthwise with respect to the guide rail 10, it is transferred by the spring 13 to the contact point 27 of the sliding groove 16 of the spring 13 (mobile element 9) with the guide rail 10, where they are summed up in one point. The force $F_a$ represents the resultant force obtained from the superposition of the two forces $F_t$ on the plane of symmetry 19. This force acts on the spring 13, namely from the side of the mobile element 9 in the direction of the guide rail 10, whereby the counterforce $F_a$ is created in the rail 10.

Figure 4:
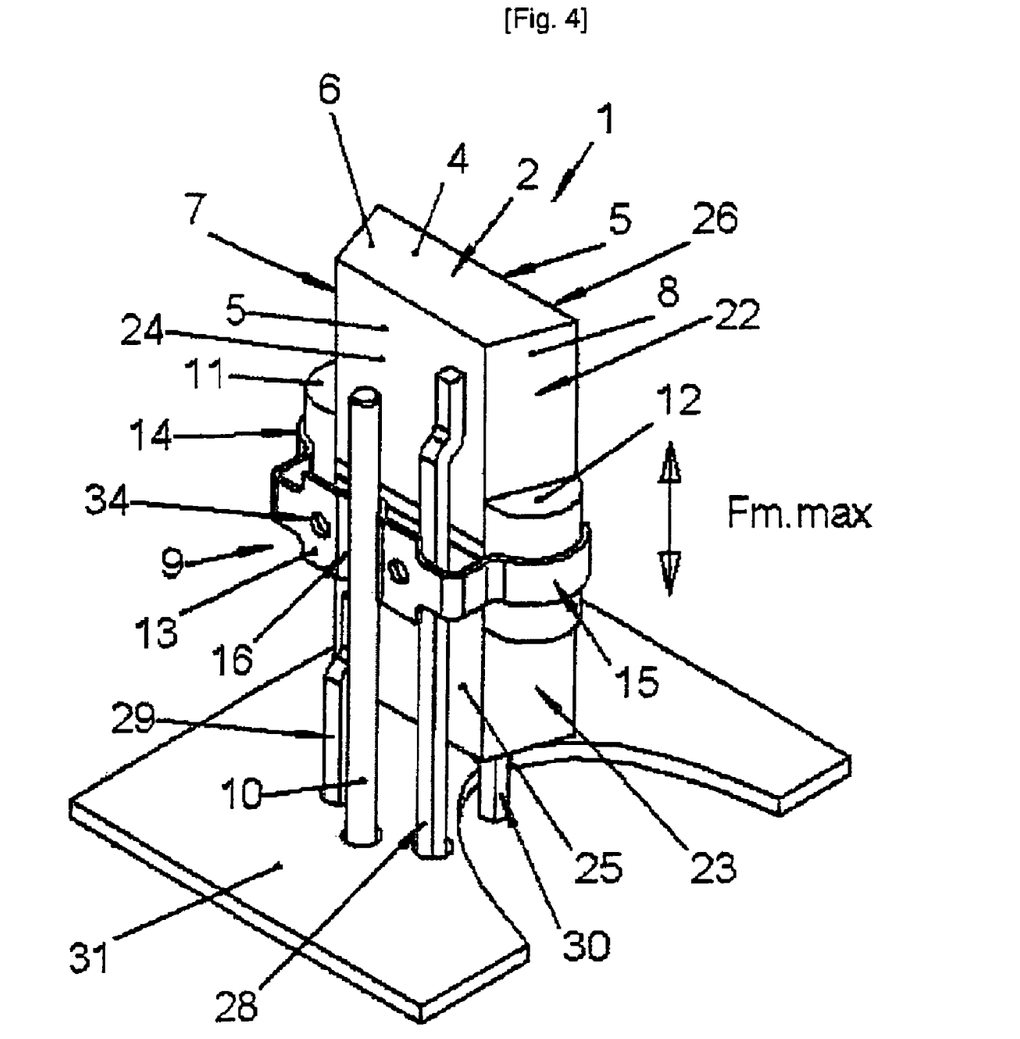
FIG. 4 shows a motor having rod-shaped connection electrodes.

FIG. 4 shows the constructive embodiment of the motor as proposed, in which the connection electrodes 24, 25, 26 are realized as elastic rods 28, 29, 30. The one ends of the connections are firmly connected to the surface of the corresponding electrodes. The other ends are fixed in relation to the guide rails 10. To this end, they may be affixed to the board 31 fixing them, on which also the guide rail 10 is located. At the same time, the board 31 may serve as connection or circuit board, respectively.

Figure 5:
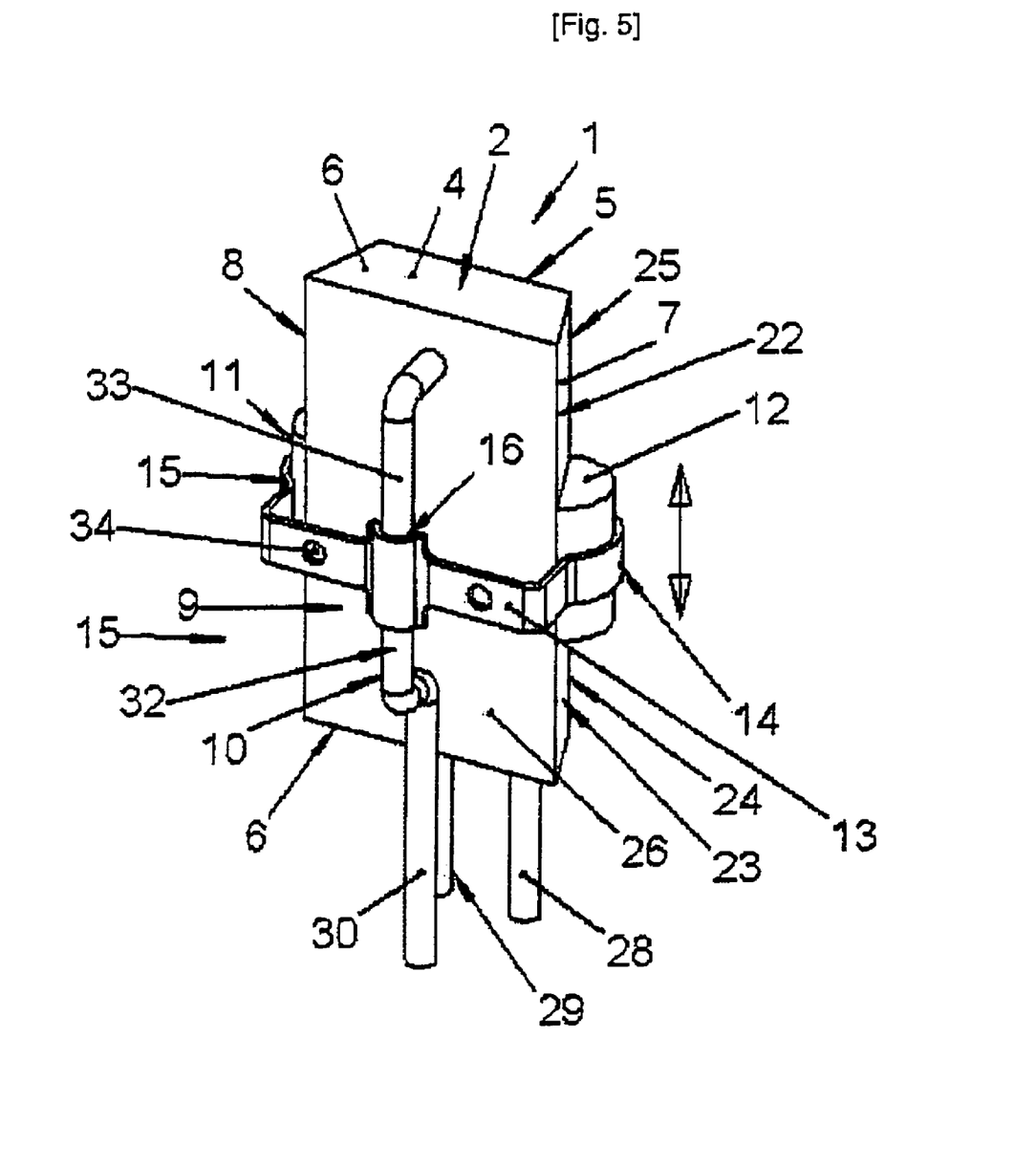
FIG. 5 shows a motor having a clamp-type guide rail.

In the motor as proposed, the guide rail 10 can be realized as a clamp 32 with a guide part 33. The clamp 32 is firmly connected to the common electrode 26 and may also be part of the firm connection 30 of the common electrode 6 (FIG. 5). The firm connections 28, 29, 30 may be manufactured from thin steel wire or beryllium bronze with a rectangular or round cross-section. They are fixed to the surface of the corresponding electrodes of the oscillator 2 by soldering or by means of a conductive adhesive.

In each of the motor modifications as proposed, the part of the optical system to be moved, e.g. the optical lens, the objective or the optical filter (these elements are not shown in FIG. 1, 2, 3, 4), is fixed to the mobile element 9. For this purpose, the spring 13 may have apertures 34 (FIG. 1, 4, 5). The mobile part can also be fixed in any other manner.

Figure 6:
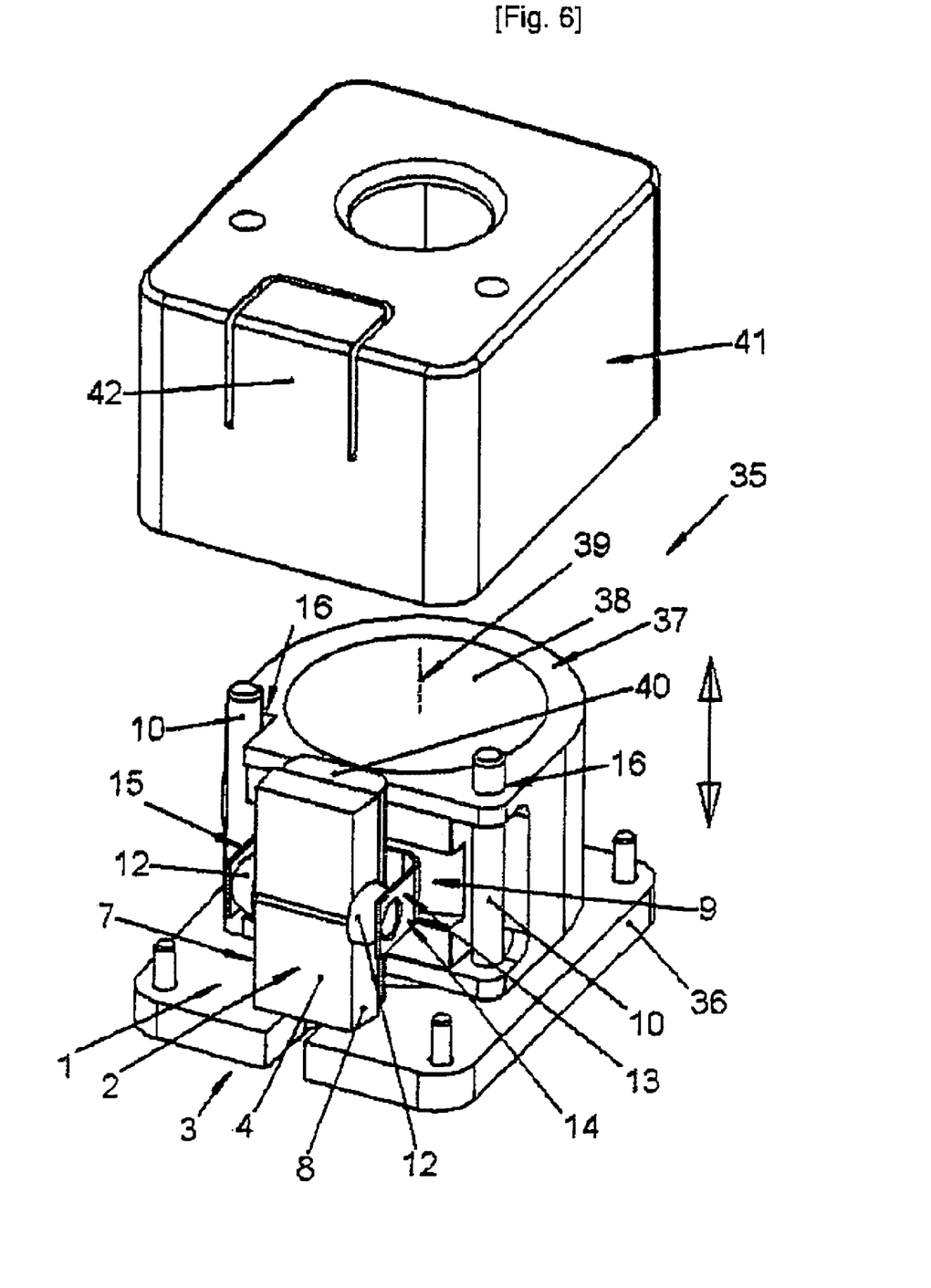
FIG. 6 shows a focusing block.

FIG. 6 shows a focusing block 35 of the miniature camera. The block 35 is comprised of a housing 3 with a base plate 36, a holder 37 for a lens group 38 having the optical axis 39, a support 40 for the oscillator 2, a lid 41 and a fixing spring 42.

By means of the forces $F_p$ the compression spring 13 presses with its fixing points 14 and 15 the friction parts 11 and 12 against the lateral faces 7 and 8 of the plate 4 of the oscillator 2 (FIG. 1). The forces $F_p$ are defined by the elasticity of the spring 13 and are predetermined by the required tensile stress $F_m$ of the miniature motor.

As the planes 17 and 18 of the lateral faces 7 and 8 are inclined at the angle λ (FIG. 2) in relation to the longitudinal plane of symmetry, the forces $F_p$ on the surfaces 7 and 8 (FIG. 3) are each divided into a force $F_n$ pressing the friction parts against the surfaces 7 and 8 and into a force $F_t$ acting lengthwise of the surfaces 7 and 8 (lengthwise of planes 17 and 18).

$$F_n = F_p * \cos \lambda$$

$$F_t = F_p * \sin \lambda$$

The ratio of the forces is:

$$F_t/F_n = T_g * \lambda$$

The force $F_n$ is determined by the required contact pressing force of the friction parts 11 and 12 acting against the surfaces 7 and 8 and is calculated as follows on the basis of the maximum tensile force $F_m$ max of the motor and the friction coefficient of the friction pair $K_f$:

$$F_n = F_m \max / K_f$$

The force $F_p$ is determined according to the following formula:

$$F_p = F_m \max / K_f * \cos \lambda$$

The force $F_t$ is transferred by the spring 13 to the guide rail 10 and acts at point 17 (FIG. 3). Each time, the force acts at the angle λ in relation to the plane of symmetry 19. The resultant force $F_a$—result of the two active forces $F_t$ pressing the mobile element 9 against the guide rails 10—is:

$$F_a = 2F_t \cos \lambda = 2F_p * \sin \lambda * \cos \lambda$$

By applying an excitation voltage to the electrodes 24 or 25—in relation to the common electrode 26—the generator for acoustic oscillations 22 or 23 is activated. By this, an asymmetric acoustic standing wave is developed in the oscillator 2 of the motor, which results in a movement of the mobile element 9 in the direction of the excited generator, namely in the manner as indicated by arrows in FIG. 1, 4, 5, 6. The switching of the excitation voltage from one (e.g. no. 22) to the other generator (e.g. no. 23) results in the reversal of the direction of movement of the element 9.

In the excited oscillator 2 the maximum tensile force $F_m$max is created, which is defined by the force $F_n$ pressing friction elements 11 and 12 against the lateral faces 7 and 8 of plate 4. These forces are determined by force $F_p$ acting by the spring 13 at the angle λ.

An essential feature of this motor construction resides in that for pressing the mobile element 9 against the guide rail 10 only a portion of the force $F_p$ (component $F_t$) generated by the compression spring 13 is used. This portion of the force can be altered by changing the angle λ to such an extent that only the force $F_a$ minimally required to press the element 9 against the guide rail 10 is applied. This allows a reduction of the friction losses between the mobile element 9 and the guide rail 10 to a minimum.

The force $F_t$ has the effect that the motor is compressed between the guide rail 10 and the holder 3 (FIG. 1). Thus, the gap between the element 9 and the guide rail 10 disappears, so that a robust construction stable against external influences is formed.

The mobile element 9 moves relative to the contour of the surface of the guide rail 10, which is manufactured as a precisely ground rod, on which the sliding groove 16 (FIG. 1) slides.

In the motor modification shown in FIG. 4 the firm connections 28, 29, 30 and the guide rail 10 are affixed to the board 31. This enlarges the constructive possibilities of the miniature motor as proposed. Thus, such a motor can be mounted as an electronic component on a circuit board.

In the modification of the motor as shown in FIG. 5 the sliding groove of the mobile element 9 slides in the guide part 33 of the clamp 32, which is fixed to the surface of the oscillator 2. This substantially simplifies the motor and reduces the friction losses during frictional contact.

FIG. 6 shows an example for the use of the proposed motor in a focusing block 35 of a miniature camera.

In this use, the oscillator 2 is pressed against the support 40 by the force components of the compression spring 13 and is fixed by the spring 42 in a vertical direction. The block is comprised of two guide rails 10 against which the sliding grooves 16 disposed on the holder 37 of the lens group 38 are pressed. The construction of the focusing block 35 permits a displacement of the lens group 38 parallel to its optical axis 39 with an accuracy defined by the alignment accuracy of the guide rails 10.

REFERENCE NUMBERS 1 motor
2 ultrasonic oscillator
3 holder
4 oscillator plate 2
5 main faces of plate 4
6 end faces of plate 4
7, 8 lateral faces of plate 4
9 mobile element
10 guide rail
11, 12 friction parts of the mobile element 9
13 compression spring
14, 15 fixing points for holding the friction parts 11, 12
16 sliding groove
17, 18 plane of the lateral faces 7, 8
19 longitudinal plane of symmetry of plate 4
20 intersection line of planes 17, 18, 19
21 longitudinal plane of symmetry of face 5
22, 23 asymmetric standing wave generators
24, 25 excitation electrodes
26 common electrode
27 contact point between mobile element 9 and guide rail 10
28, 29, 30 firm connections
31 board
32 part of connection 30 as clamp
33 guide part of clamp 32
34 fixing apertures
35 focusing block of the camera
36 base plate of block 35
37 holder for the lens group 38
38 lens group
39 optical axis of the lens group 38
40 support for the oscillator 2
41 lid
42 fixing spring

The invention claimed is:

1. An ultrasonic linear motor, comprising a plate-type ultrasonic oscillator with two planar parallel main faces, two end faces and two lateral faces, and a mobile element engaged with at least one guide rail and having two friction parts, said element frictionally interacting with the ultrasonic oscillator via the lateral faces of the friction parts, characterized in that the lateral faces of the ultrasonic oscillator are planar and are inclined at like angles in relation to a longitudinal plane of symmetry in such a way that the intersection lines between the planes of the lateral faces and the longitudinal plane of symmetry extend parallel to the main faces of the ultrasonic oscillator, and that the friction parts of the mobile element are resiliently connected to each other, wherein the friction parts of the mobile element press against the corresponding lateral faces of the ultrasonic oscillator with a first contact pressing force and the mobile element presses against the guide rail with a second contact pressing force, wherein the ratio between the first and second contact pressing forces is determined by the angle of inclination of the lateral faces in relation to the longitudinal plane of symmetry of the ultrasonic oscillator.

2. The ultrasonic linear motor according to claim 1, characterized in that
connection electrodes of the ultrasonic oscillator comprise elastic, thin, conductive rods, the one end of which is firmly connected to the corresponding electrodes and the other end of which is firmly fixed in relation to the guide rail.

3. The ultrasonic linear motor according to claim 2, characterized in that
the guide rail is realized in a clamp-type manner and is firmly connected to a common electrode of the ultrasonic oscillator.

4. The ultrasonic linear motor according to claim 1, characterized in that
the friction parts of the mobile element are connected to each other by a compression spring element and are elastically biased against each other.

5. The ultrasonic linear motor according to claim 4, characterized in that
the compression spring element is realized in a clamp-type manner, with the friction parts being placed at the free ends of the legs of the clamp.

6. The ultrasonic linear motor according to claim 1, characterized in that
the main faces and/or the lateral faces of the ultrasonic oscillator are rectangular.

7. The ultrasonic linear motor according to claim 2, characterized in that
the friction parts of the mobile element are connected to each other by a compression spring element and are elastically biased against each other.

8. The ultrasonic linear motor according to claim 3, characterized in that
the friction parts of the mobile element are connected to each other by a compression spring element and are elastically biased against each other.

9. The ultrasonic linear motor according to claim 2, characterized in that
the main faces and/or the lateral faces of the ultrasonic oscillator are rectangular.

10. The ultrasonic linear motor according to claim 3, characterized in that
the main faces and/or the lateral faces of the ultrasonic oscillator are rectangular.

11. The ultrasonic linear motor according to claim 4, characterized in that
the main faces and/or the lateral faces of the ultrasonic oscillator are rectangular.

12. The ultrasonic linear motor according to claim 5, characterized in that
the main faces and/or the lateral faces of the ultrasonic oscillator are rectangular.

* * * * *

UNITED STATES PATENT AND TRADEMARK OFFICE
CERTIFICATE OF CORRECTION

| | | |
|---|---|---|
| PATENT NO. | : 7,973,451 B2 | |
| APPLICATION NO. | : 12/083815 | |
| DATED | : July 5, 2011 | |
| INVENTOR(S) | : Wischnewskij et al. | |

It is certified that error appears in the above-identified patent and that said Letters Patent is hereby corrected as shown below:

Title Page,

Amend Item (73) Assignee as follows:

Change "Physic Instrumente (PI) GmbH & Co. KG" to --Physik Instrumente (PI) GmbH & Co. KG--.

Signed and Sealed this

Seventh Day of February, 2012

David J. Kappos
*Director of the United States Patent and Trademark Office*